United States Patent
Kot et al.

(10) Patent No.: US 10,632,937 B2
(45) Date of Patent: Apr. 28, 2020

(54) BUS BAR

(71) Applicant: Aptiv Technologies Limited, St. Michael (BB)

(72) Inventors: Pawel Kot, Trzyciaz (PL); Dariusz Hebda, Wieliczka (PL); Dawid Bebenek, Skawina (PL); Konrad Stefanski, Cracow (PL)

(73) Assignee: Aptiv Technologies Limited (BB)

( * ) Notice: Subject to any disclaimer, the term of this patent is extended or adjusted under 35 U.S.C. 154(b) by 0 days.

(21) Appl. No.: 16/372,957

(22) Filed: Apr. 2, 2019

(65) Prior Publication Data
US 2019/0337470 A1    Nov. 7, 2019

(30) Foreign Application Priority Data
May 7, 2018   (EP) .................................. 18171061

(51) Int. Cl.
| | | |
|---|---|---|
| *H01B 1/20* | (2006.01) | |
| *B60R 16/02* | (2006.01) | |
| *H01H 85/044* | (2006.01) | |
| *H02B 1/20* | (2006.01) | |
| *H02G 5/00* | (2006.01) | |
| *H01H 85/055* | (2006.01) | |

(52) U.S. Cl.
CPC .......... *B60R 16/02* (2013.01); *H01H 85/044* (2013.01); *H02B 1/20* (2013.01); *H02G 5/002* (2013.01); *H01H 2085/0555* (2013.01)

(58) Field of Classification Search
CPC ........................................................ H01B 1/20
USPC .......................................................... 174/72
See application file for complete search history.

(56) References Cited

U.S. PATENT DOCUMENTS

| | | | |
|---|---|---|---|
| 2002/0053456 A1 | 5/2002 | Nishida | |
| 2004/0130430 A1* | 7/2004 | Matsumura | H01H 85/044 337/181 |
| 2008/0029403 A1* | 2/2008 | Ramaswamy | C25C 3/16 205/230 |
| 2013/0062937 A1 | 3/2013 | Fussl et al. | |
| 2014/0097932 A1* | 4/2014 | Fussl | H01H 85/044 337/191 |
| 2015/0333498 A1* | 11/2015 | Weeks | H02H 3/06 361/42 |

FOREIGN PATENT DOCUMENTS

| | | | | |
|---|---|---|---|---|
| DE | 20 2009 009607 U1 | | 9/2009 | |
| DE | 202009009607 | * | 9/2009 | ............... H01B 1/20 |
| EP | 1 498 927 A1 | | 1/2005 | |

* cited by examiner

*Primary Examiner* — Stanley Tso
(74) *Attorney, Agent, or Firm* — Joseph V. Bonadies

(57) ABSTRACT

A straight bus bar includes an axial direction and having a rigid first portion with a first contact surface connectable to a first fuse, an axially spaced rigid second portion with a second contact surface connectable to a second fuse, and a connecting portion electrically connecting the first portion and the second portion. The connecting portion is a resilient compensation portion having at least two lateral recesses extending from opposite sides into the bus bar making the connecting portion elastically bendable to allow a relative axial movement of the first and second portions when an axial force is applied to the bus bar.

15 Claims, 9 Drawing Sheets

BUS BAR

TECHNICAL FIELD OF INVENTION

This disclosure generally relates to a straight bus bar defining an axial direction, and more particularly to a straight bus bar that is used in a vehicle

BACKGROUND OF INVENTION

A straight bus bar can be used in a vehicle's electrical system to electrically connect multiple midi fuses to it. In an internally known design, the bus bar is made of rigid conductive metal and is mechanically and electrically connected to one end of a fuse and the other end of the fuse is mechanically connected to a housing made of non-conductive plastic. The main direction of the fuse is arranged perpendicular to the axial direction of the bus bar. When the vehicle is exposed to hot or cold climate conditions, the bus bar and the housing will thermally expand or contract due to a change of temperature. A problem occurs due to the fact that the bus bar made of metal and the housing made of plastic have different thermal expansion coefficients. When the bus bar and the housing heat up, the bus bar will expand less in its axial direction due to the lower thermal expansion coefficient than the housing will expand in the same direction. As a result, the fuse between the bus bar and the housing will experience a shear force. Since the fuse is mechanically weak, it can break in high or low temperature regions such as >130° C. or <−40° C. This causes discomfort for the owner of the vehicle because functionality of the vehicle is lost.

SUMMARY OF THE INVENTION

Techniques are described herein to provide an improved bus bar that assures that an attached fuse does not break when the bus bar expands or contracts relative to a housing attached to the bus bar and the fuse.

Described herein is bus bar that defines an axial direction and has a rigid first portion with a first contact surface connectable to a first fuse, an axially spaced rigid second portion with a second contact surface connectable to a second fuse, and a connecting portion mechanically and electrically connecting the first portion and the second portion. The connecting portion is a resilient compensation portion having at least two lateral recesses extending from opposite sides into the bus bar making the connecting portion elastically bendable to allow a relative axial movement of the first and second portions when an axial force is applied to the bus bar.

More specifically, the straight bus bar has a length in the axial direction, a width and a height. The height is preferably smaller than the width and the length. Along the length of the bus bar, there is the first portion, followed by the connecting portion, again followed by the second portion. Due to each of the lateral recesses, the width of the bus bar is smaller in a section of the connecting portion. The connecting portion has a shape which allows a section of the connecting portion, a bendable zone, to elastically bend around a normal axis extending in the height direction of the bus bar. The shape of the connecting portion allows a relative axial movement of the first and second portions when an axial force is applied to the bus bar.

Advantageous embodiments of the bus bar and an electric assembly in which the bus bar can be used can be taken from the following description, the dependent claims and the drawings.

In accordance with an embodiment, the connecting portion comprises three lateral recesses wherein two recesses extend from the same side axially spaced from another into the bus bar. This improves the resiliency of the connection region so that relative axial movement of the first and second portions is achieved with less axial force applied to the bus bar.

According to a further embodiment, the connecting portion consists of a single connector web. This simplifies the manufacturing process of the bus bar.

In another embodiment, the connector web extends from an eccentric part of a face side of the first portion to any part of a face side of the second portion or from any part of a face side of the first portion to an eccentric part of a face side of the second portion. The connector web can extend from an eccentric part of a face side of the first portion to an eccentric part of a face side of the second portion. In particular, the connector web extends from an outer end of the face side of the first portion to a part of a face side of the second portion or from any part of the face side of the first portion to an outer end of a face side of the second portion. The connector web can extend from an outer end of the face side of the first portion to an outer end of a face side of the second portion. In general, the further away from a centric part the connector web starts, the more resiliency of the connection region can be expected.

According to a further embodiment, the connector web is generally U-shaped or V-shaped. That means that the connector web extends along a path that is generally U-shaped or V-shaped. This shape has shown good resiliency and can be manufactured in a simple cutting process.

According to another embodiment, the connector web extends from a centric part of a face side of the first portion to a centric part of a face side of the second portion. The connector web then comprises a bend which ensures that the connector is bendable.

In a further embodiment, the connector comprises two separate interconnecting parts that are preferably formed mirror-symmetrical to each other. This helps to ensure that the first portion and the second portion stay aligned to each other in the axial direction.

According to another embodiment, the connecting portion comprises at least two connectors. The connecting portion can comprise at least three connectors. This can improve the electricity transmission of the bus bar. In particular, the connecting portion consists of at least two connectors. For example, the connecting portion can consist of two connectors or three connectors.

According to another aspect of the invention, a bus bar defining an axial direction and having a rigid first portion with a first contact surface connectable to a first fuse, an axially spaced rigid second portion with a second contact surface connectable to a second fuse, and a resilient compensation portion mechanically and electrically connecting the first portion and the second portion is used to electrically and mechanically connect at least two separate fuses. The resilient compensation portion is elastically deformable to allow a relative axial movement of the first and second portions when an axial force is applied to the bus bar The bus bar is preferably configured according to one of the embodiments disclosed above.

The bus bar is preferably used to protect a fuse from being mechanically destroyed due to a different thermal expansion of the bus bar in comparison to a housing connected to the fuse and the bus bar.

According to a further aspect of the invention, an electric assembly comprising a bus bar according to any one of the above described embodiments and a fuse is provided. Additionally, a housing made of a material having a different coefficient of thermal expansion than the bus bar can be provided.

According to an embodiment, a first end of the fuse is mechanically and electrically connected to the first contact surface of the first portion of the bus bar and a second end of the fuse is mechanically connected to the housing. In this arrangement, the bus bar comprising the connecting portion that is a resilient compensation portion is helpful to avoid breaking of the fuse due to shear forces caused by relative thermal expansion of the bus bar with respect to the housing.

In order to assure that the first portion of the bus bar does not move relative to the housing when the bus bar and the housing are exposed to a temperature change, the housing can be mechanically, in particular positively, connected to the first portion of the bus bar so that axial movement of the first portion relative to the housing is restricted in at least one axial direction.

In a further embodiment, the housing comprises an elevation contacting a first face side of the first portion to axially fixate the first portion so that axial movement of the first portion in a first axial direction relative to the housing is restricted by the elevation. In the context of this disclosure, a face side of the bus bar is any side of the bus bar that is approximately facing in the axial direction of the bus bar. The advantage of this embodiment is that the first portion of a generally cuboid bus bar having at least one lateral recess or a hole can be safely secured to the housing.

According to another embodiment, the elevation further contacts a second face side of the bus bar to axially fixate the first portion so that axial movement of the first portion in an opposite second axial direction relative to the housing is restricted by the elevation. The first portion is therefore axially fixed in both directions. The elevation can contact a face side of the connecting portion, i.e. the face side can be formed on a face side of a web of the connecting portion.

In a further embodiment, the second portion comprises a hole which is configured to receive the elevation. The hole can have an inner axial extend that is equal to the axial extend of the elevation. Then, the first portion is axially fixed to the housing in both axial directions. In particular, the hole can have the form and size of the elevation. In this embodiment, the first portion is fixed to the housing in two perpendicular directions.

The bus bar can be especially helpful when the fuse is a midi fuse. The fuse can have a first minimum cross-section and the connecting portion can have a second combined minimum cross-section that is larger than the first minimum cross-section of the fuse. A combined minimum cross section of the connecting portion is defined as the smallest cross section of the single connector web, if the connecting portion consists of a single connector web, or of the smallest cross sections of multiple connector webs combined, if the connecting portion consists of multiple connector webs.

According to another embodiment, multiple fuses are connected to the bus bar wherein the fuse with the smallest tripping current is connected to the first contact surface of the first portion. The fuse with the smallest tripping current is usually the mechanically weakest fuse. When the weakest fuse is connected to the first contact surface, it is placed closely to the resilient compensation portion of the bus bar. This helps protecting the mechanically weakest fuse against shear force since the resilient compensation portion is able to compensate for the relative axial movement of the bus bar and the housing due to a change of temperature.

In an embodiment, the first contact surface of the first portion is placed at an end position of the bus bar.

While the invention is illustrated with a bus bar only having one resilient compensation portion, it is understood that the bus bar may comprise two or more resilient compensation portions.

Further features and advantages will appear more clearly on a reading of the following detailed description of the preferred embodiment, which is given by way of non-limiting example only and with reference to the accompanying drawings.

BRIEF DESCRIPTION OF DRAWINGS

The invention will now be described in more detail with reference to the drawings. In the drawings, like or reference characters or reference signs increased by a hundred denote corresponding features consistently throughout similar embodiments.

DETAILED DESCRIPTION

Figure 1A:
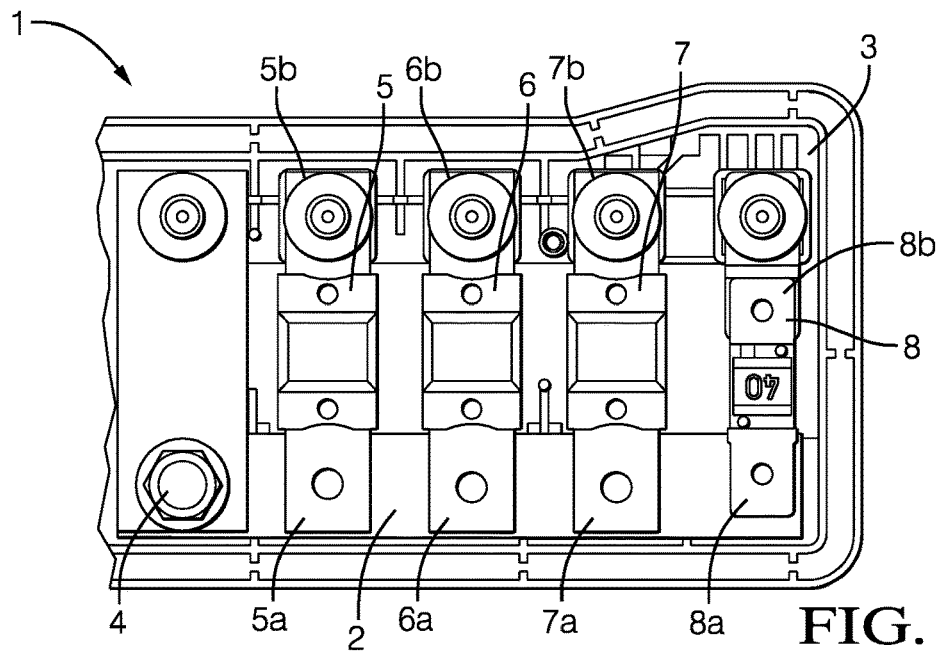
FIG. 1A shows a top view of an electric assembly with a bus bar according to internal state of the art.
Figure 1B:
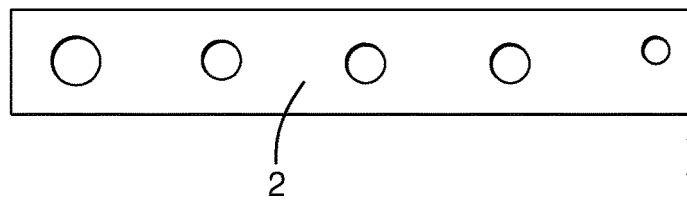
FIG. 1B shows a top view of the bus bar of FIG. 1A.
Figure 2A:
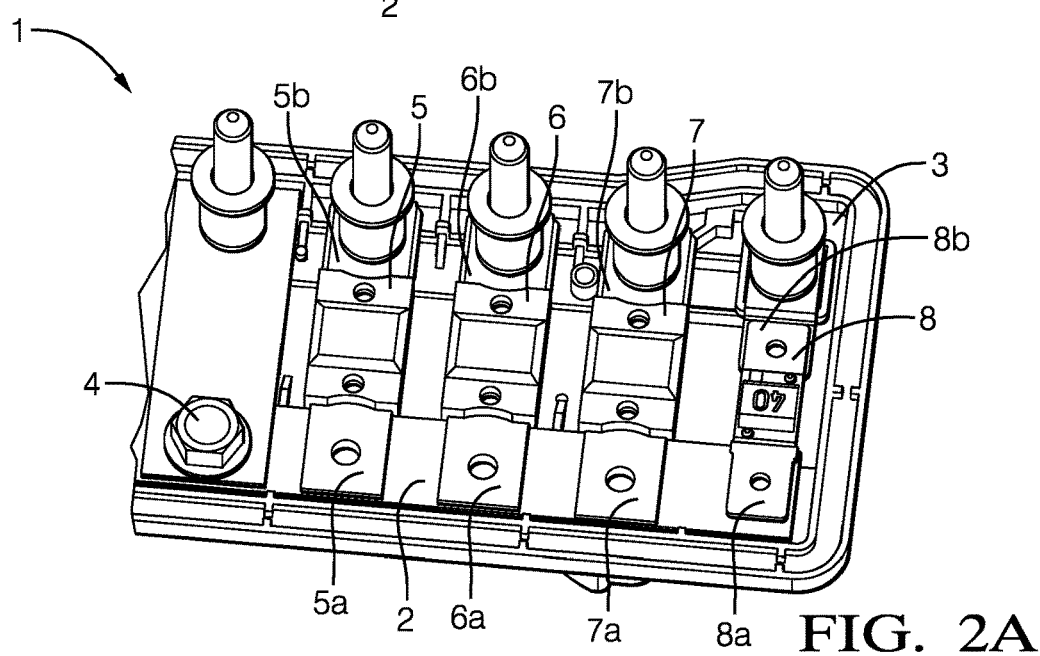
FIG. 2A shows a perspective view of the electric assembly of FIG. 1A.
Figure 2B:
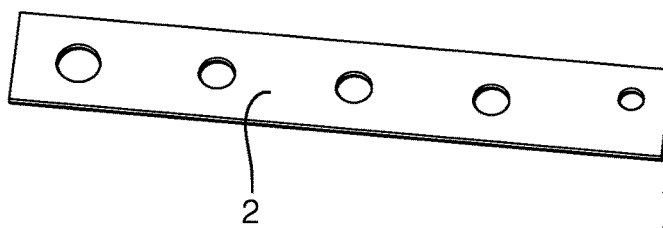
FIG. 2B shows a perspective view of the bus bar of FIG. 1A.
Figure 3A:
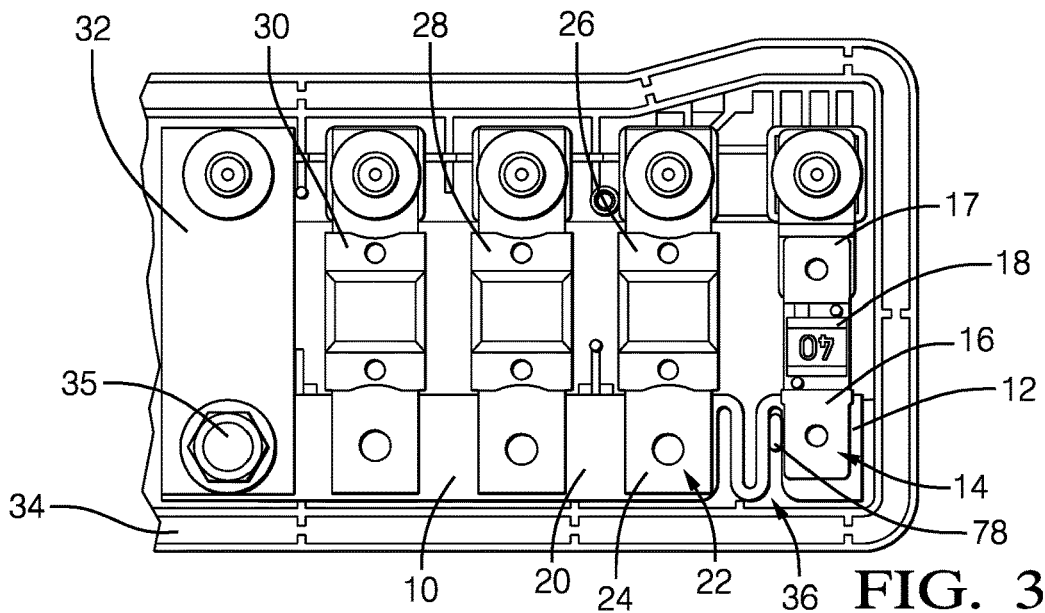
FIG. 3A shows a top view of an electric assembly with a bus bar according to a first embodiment of the present disclosure.
Figure 3B:
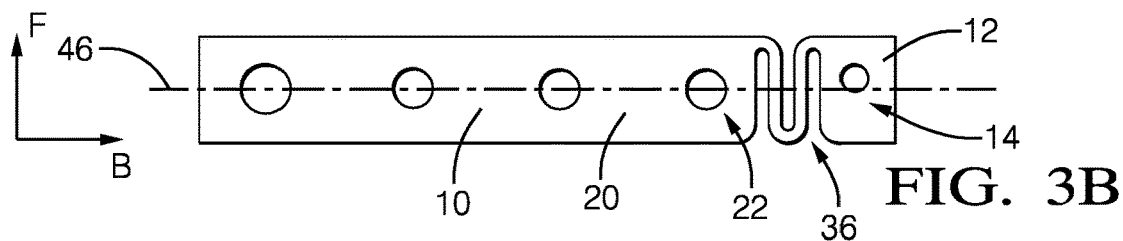
FIG. 3B shows a top view of the bus bar of FIG. 3A.
Figure 4A:
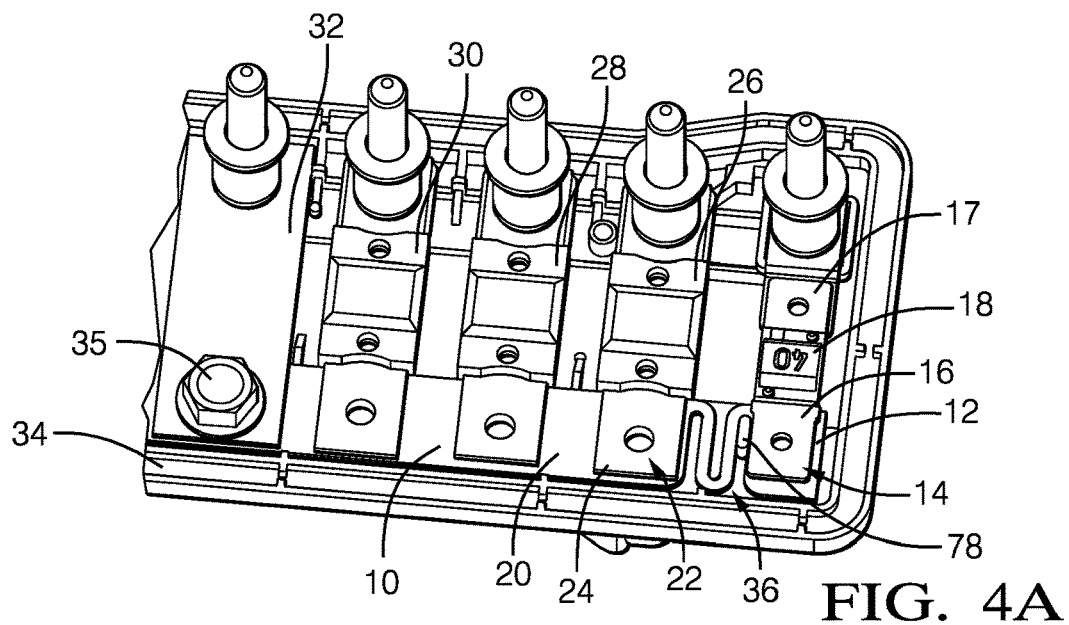
FIG. 4A shows a perspective view of the electric assembly of FIG. 3A.
Figure 4B:
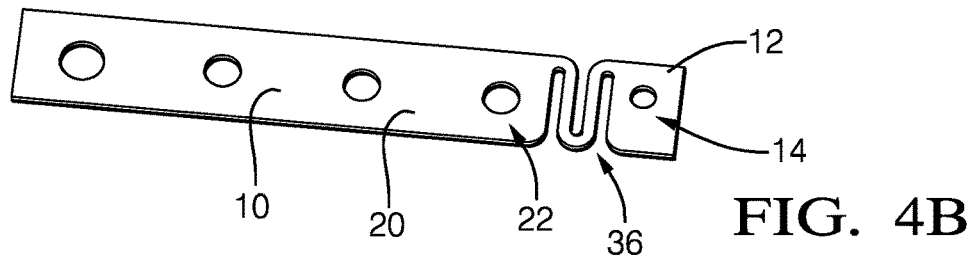
FIG. 4B shows a perspective view of the bus bar of FIG. 3A.
Figure 4C:
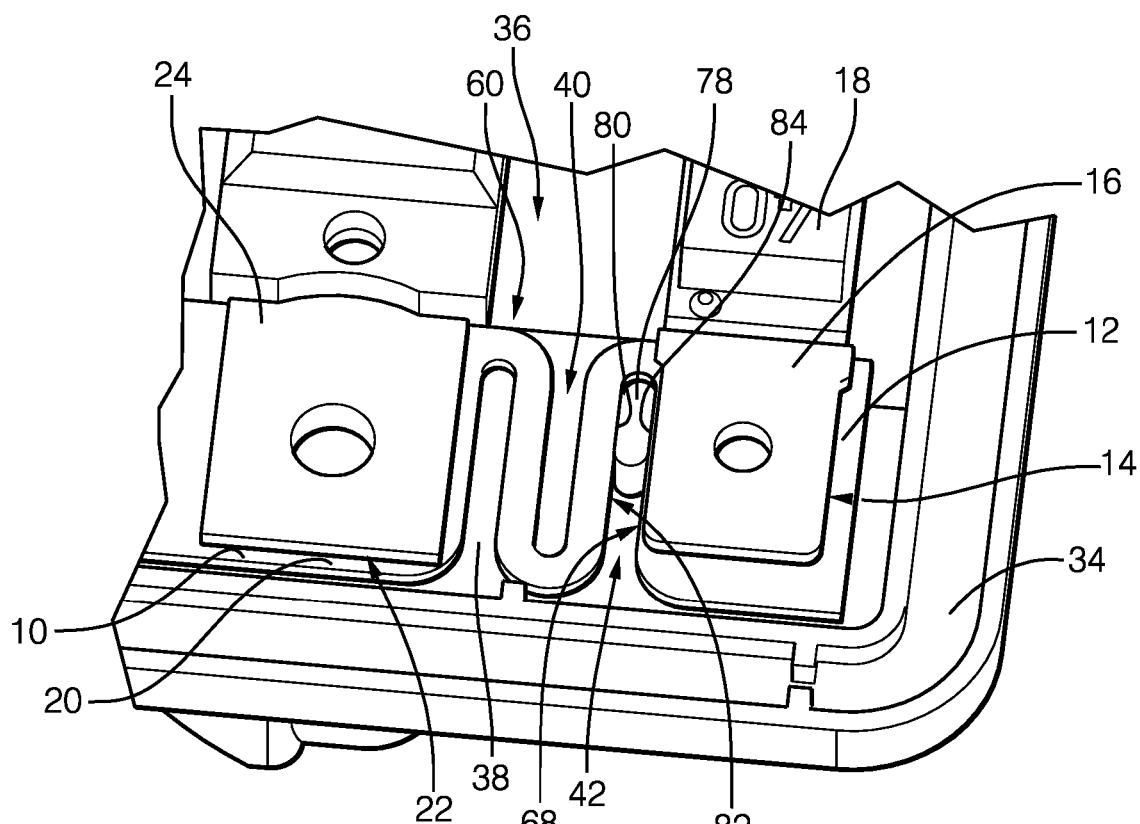
FIG. 4C shows a detail view of FIG. 4A.
Figure 4D:
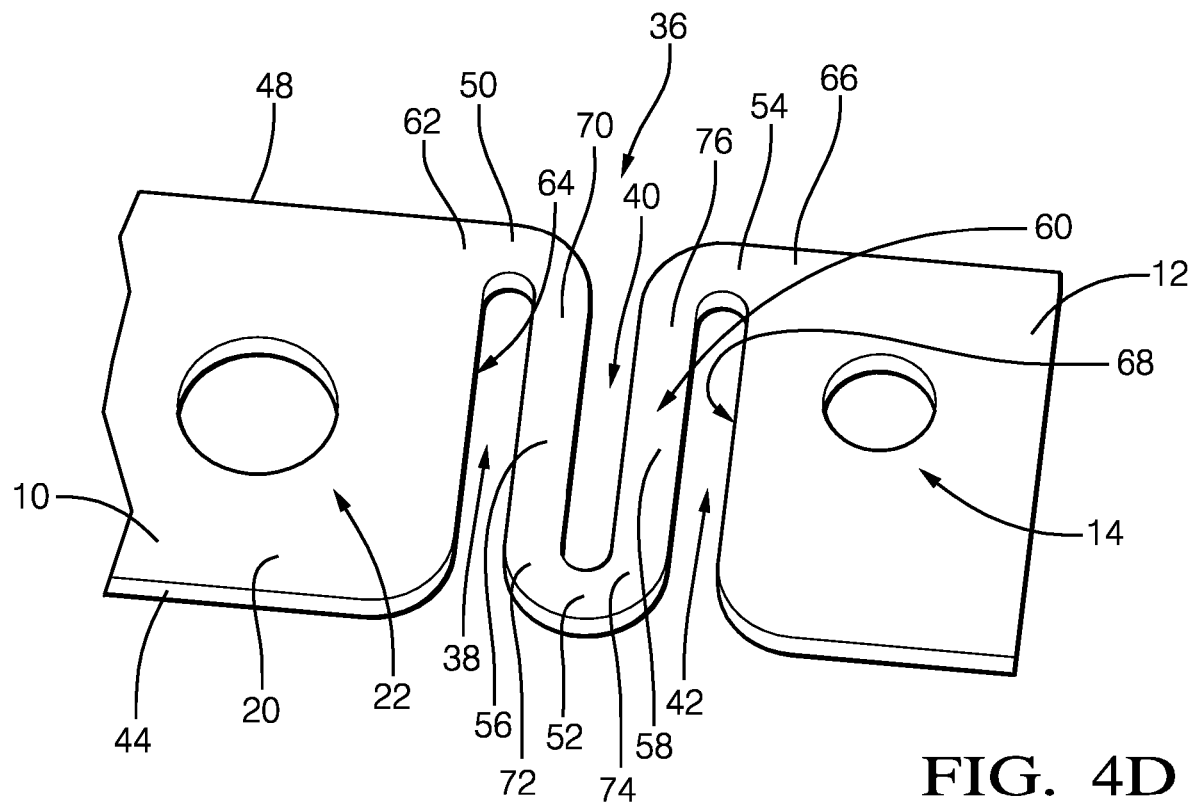
FIG. 4D shows a detail view of FIG. 4B.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIG. 1A to 2B depict an electric assembly 1 with a straight rigid bus bar 2 according to an internal state of the art and a housing 3 made of plastic. The bus bar 2 is mechanically connected to the housing 3 by a screw 4. Multiple fuses 5, 6, 7 and 8 are clinched to the rigid bus bar 2 so that the fuses 5, 6, 7 and 8 are mechanically and electrically connected to the bus bar 2 at a first ends 5a, 6a, 7a, 8a of the fuses. The fuses 5, 6, 7 and 8 are mechanically connected to the housing 3 at a second ends 5b, 6b, 7b, 8b of the respective fuses 5, 6, 7, 8. A main direction F of the fuses is arranged perpendicular to a main direction B of the bus bar. When the bus bar 2 and the housing 3 thermally expand in the main direction B due to a rise of temperature of the bus bar 2, the housing 3 expands more than the bus bar 2. This leads to the first ends 5a, 6a, 7a, 8a of the fuses which are attached to the bus bar 2 being pushed less in the main direction B of the bus bar 2 (in the Figures to the right) than the second ends 5b, 6b, 7b, 8b of the fuses which are connected to the housing 3. The reason for that is the difference in thermal expansion coefficient between the bus bar 2 and the housing 3, i.e. the housing 3 has a higher thermal expansion coefficient than the bus bar 2. Due to different movement of the first ends 5a, 6a, 7a, 8a of the fuses and the second ends 5b, 6b, 7b, 8b, of the fuses a shear force is applied to the fuses 5, 6, 7, 8. This shear force can cause mechanical destruction of the fuses 5, 6, 7, 8 since the fuses 5, 6, 7, 8 are usually made of a thin web. In particular, the fuse 8, which is placed the furthest from the screw 4 and which usually has the smallest tripping current and the smallest mechanical load capacity can break due to the shear force applied to it.

In order to solve this issue, a variety of bus bars 10 to 710 are provided (FIG. 3A to 10C) that can avoid breakage of the fuse 8.

In FIGS. 3A to 4D, a straight bus bar 10 according to a first embodiment of the invention is shown. The bus bar 10 comprises a rigid first portion 12 with a first contact surface 14 that is connected to a first end 16 of a first fuse 18 (FIGS. 3A and 4A) and a rigid second portion 20 with a second contact surface 22 that is connected to a first end 24 of a second fuse 26. A third fuse 28, fourth fuse 30 and fifth fuse 32 are also connected to the bus bar 10 at their respective first ends.

The bus bar 10 is mechanically connected to a housing 34 via a screw 35. The housing 34 is made of a non-conductive material with a higher thermal expansion coefficient than the material of the bus bar 10, e.g. plastic. Thus, when the housing 34 and the bus bar 10 warm up due to a temperature rise around the bus bar 10 and the housing 34, they both expand in an axial direction i.e. the main direction B of the bus bar (FIG. 3B), and a lateral direction, i.e. the main direction F of the fuses. However, the bus bar 10 expands less than the housing 34 due to the lower thermal expansion coefficient of the bus bar 10. In order to compensate for the lower expansion in the axial direction, a resilient compensation portion 36, which may also be referred as a connecting portion 36, is provided between the rigid first portion 12 and the rigid second portion 20.

The resilient compensation portion 36 according to the first embodiment of FIGS. 3A to 4D comprises three lateral recesses, i.e. recesses that extend from a side surface laterally into the bus bar, a first lateral recess 38, a second lateral recess 40, and a third lateral recess 42. The first lateral recess 38 extends from a first side surface 44 into the bus bar 10 further than a centerline 46 (FIG. 3B) until only a first web portion 50 remains at an end of the lateral recess 38. The second lateral recess 40 extends from a second side surface 48 parallel to the first lateral recess further than the centerline 46 until only a second web portion 52 remains at the end of the second lateral recess 40. The third lateral recess 42, same as the first lateral recess 38, extends from the first side surface 44 into the bus bar 10 further than the centerline 46 until only a third web portion 54 remains at an end of the third lateral recess 42. The lateral recesses 38, 40 and 42 are spaced from each other in an axial direction so that lateral web portions 56 and 58 are formed respectively between the first lateral recess 38 and the second lateral recess 40 and between the second lateral recess 40 and the third lateral recess 42. The lateral web portions 56 and 58 have a similar width as the web portions 50, 52 and 54. The web portions 50, 56, 52, 58 and 54 together form a U-shaped web 60 extending from an eccentric part 62 of a face side 64 of the rigid second portion 20 to an eccentric part 66 of a face side 68 of the rigid first portion 12.

The U-shaped web 60 forms a first bendable zone 70 at a connection between the first web portion 50 and the lateral web portion 56, a second bendable zone 72 between the lateral web portion 56 and the second web portion 52, a third bendable zone 74 between the second web portion 52 and the lateral web portion 58, and a fourth bendable zone 76 between the lateral web portion 58 and the third web portion 54. Each bendable zone 70, 72, 74 and 76 is formed by a 90° bend of the web 60.

The housing 34 comprises an elevation 78 which projects into the third lateral recess 42. The elevation 78 forms a first side 80 contacting a face side 82 of the lateral web portion 58 and a second side 84, facing in the opposite direction of the first side 80, contacting the face side 68 of the rigid first portion 12. The elevation 78 is configured to keep the rigid first portion 12 in its axial position, even when the bus bar 10 expands or contracts due to a temperature change. When the bus bar 10 and the housing 34 contract due to a drop in temperature, the bus bar 10 contracts less than the housing 34 in its axial direction, i.e. the bus bar 10 expands relative to the housing 34. The resilient compensation portion 36 compensates the axial expansion by being bendable in its bendable zones 70, 72, 74, and 76. The web 60 bends so that the widths of the lateral recesses 38, 40, and 42 get smaller. That means that the rigid second portion 20 moves towards the first lateral web portion 56 which bends the first lateral web portion 56 towards the first face side 64 of the rigid second portion 20. At the same time, the first lateral web portion 56 moves towards the second lateral web portion 58 which bends the first lateral web portion 56 and the second lateral web portion 58 towards each other. Further, the second lateral web portion 58 is bent towards the face side 68 of the first rigid portion 12. In summary, when the overall bus bar 10 expands relative to the housing 34, the resilient compensation portion 36 automatically elastically contracts, and when the overall bus bar 10 contracts relative to the housing 34, the resilient compensation portion 36 automatically elastically expands. In other words, the length of the bus bar 10 is automatically adjusted to the thermal expansion or contraction of the housing 34.

The compensation portion 36 is configured to protect the first fuse 18 by avoiding that shear force is applied to the fuse 18. Instead of transferring the axial expansion movement of the bus bar 10 to the fuse 18, the resilient compensation portion 36 stores the energy caused by the expansion movement of the bus bar 10 by elastic deformation.

Figure 5A:
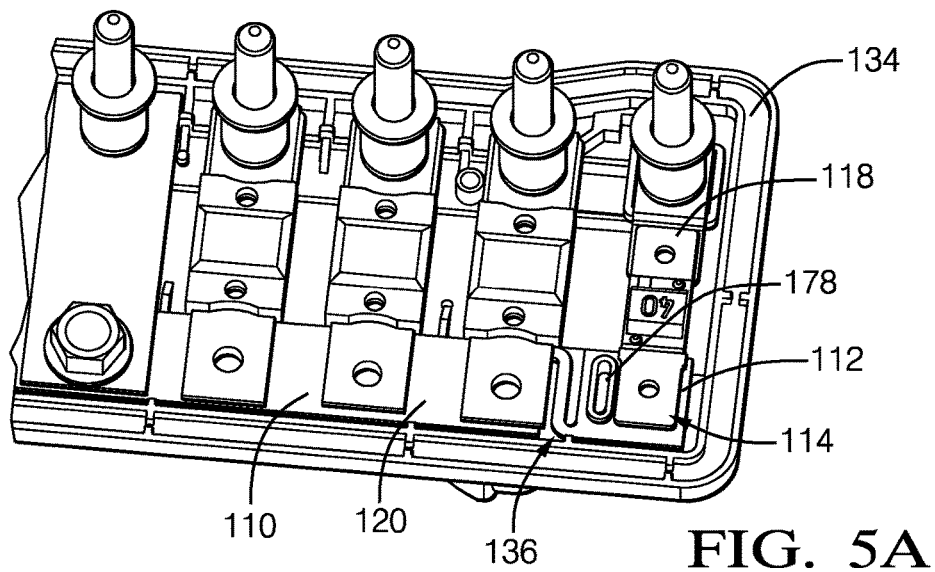
FIG. 5A shows a perspective view of an electric assembly with a bus bar according to a second embodiment of the present disclosure.
Figure 5B:
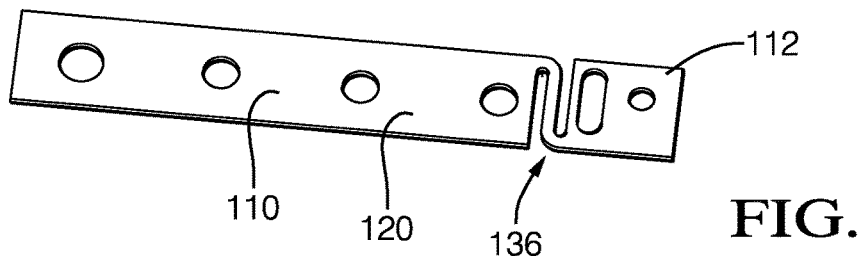
FIG. 5B shows a perspective view of the bus bar of FIG. 5A.
Figure 5C:
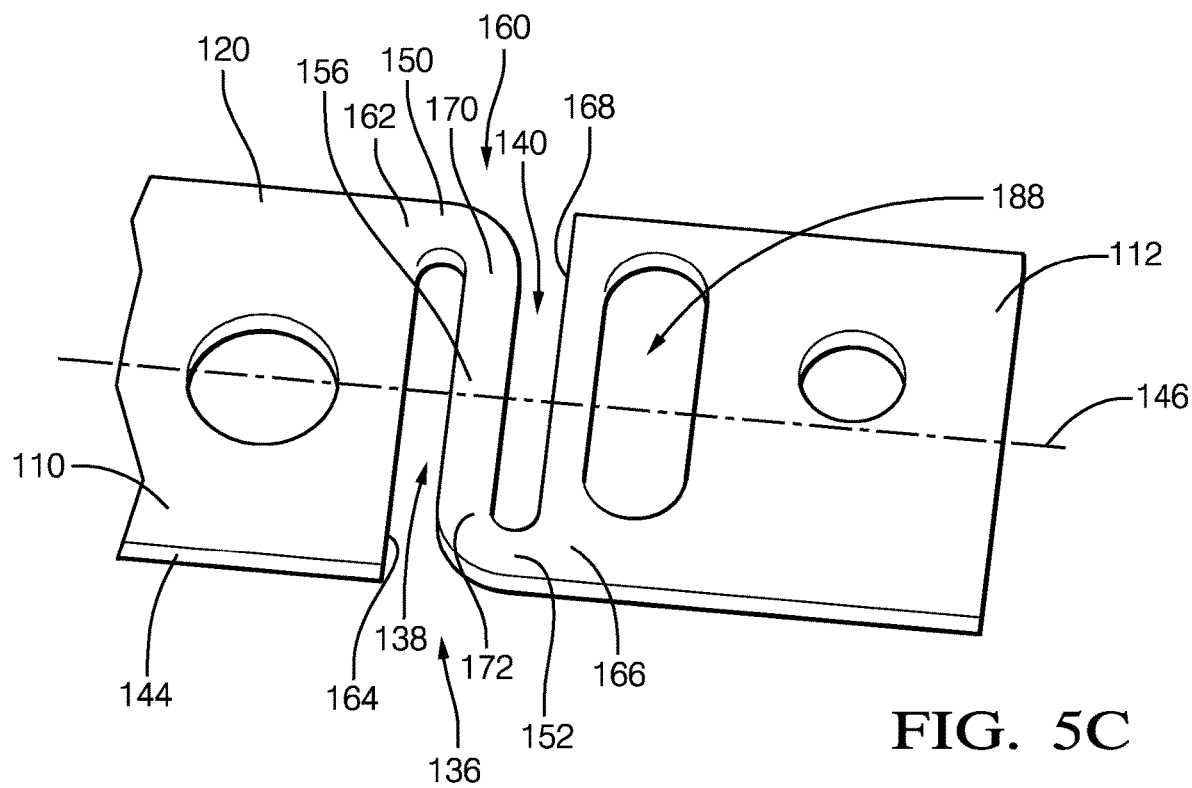
FIG. 5C shows a detail view of FIG. 5B.

FIG. 5A to 5C depict a second embodiment of a bus bar 110 according to the invention. The bus bar 110 has a rigid first portion 112 and a rigid second portion 120 which are connected to each other by a resilient compensation portion 136. The resilient compensation portion comprises a first lateral recess 138 extending from a first side surface 144 into the bus bar 110 further than a centerline 146 until only a first web portion 150 remains at an end of the lateral recess 138. The resilient compensation portion also comprises a second lateral recess 140 extending from a second side surface 148 parallel to the first lateral recess 138 further than the centerline 146 until only a second web portion 152 remains at the end of the lateral recess 140.

The lateral recesses 138 and 140 are spaced from each other in an axial direction so that a lateral web portion 156 is formed between the first lateral recess 138 and the second lateral recess 140. The lateral web portion 156 has a similar width than the web portions 150 and 152. The web portions 150, 156, and 152 together form a mirrored S-shaped web 160 extending from an eccentric part 162 of a face side 164 of the rigid second portion 120 to an eccentric part 166 of a face side 168 of the rigid first portion 112.

The mirrored S-shaped web 160 forms a first bendable zone 170 at a connection between the first web portion 150 and the lateral web portion 156 and a second bendable zone 172 between the lateral web portion 156 and the second web portion 152. Each of the bendable zones 170 and 172 are formed by a 90° bend of the web 160.

An oval hole 188 is formed in the rigid first portion 112 of the bus bar 110 to receive an oval elevation 178 (FIG. 5A) of a housing 134. The elevation's outer form is adapted to the hole's inner form so that the elevation's outer surface is contacting the hole's inner surface. The elevation 178 axially fixates the rigid first portion 112 so that no shear force is applied to a first fuse 118 connected to a first contact surface 114 of the rigid first portion 112.

Figure 6A:
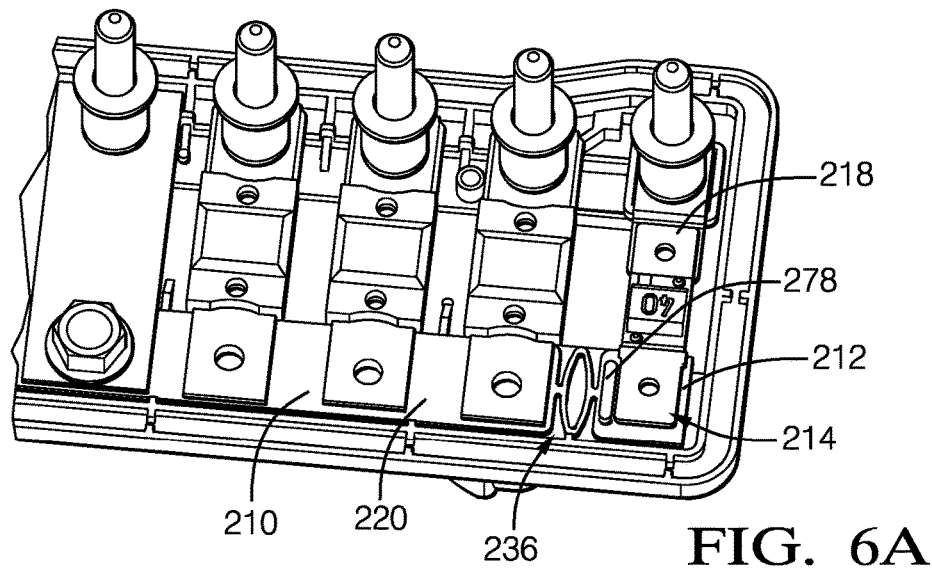
FIG. 6A shows a perspective view of an electric assembly with a bus bar according to a third embodiment of the present disclosure.
Figure 6B:
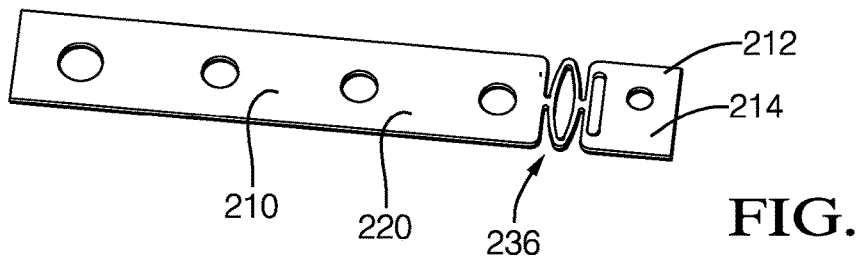
FIG. 6B shows a perspective view of the bus bar of FIG. 6A.
Figure 6C:
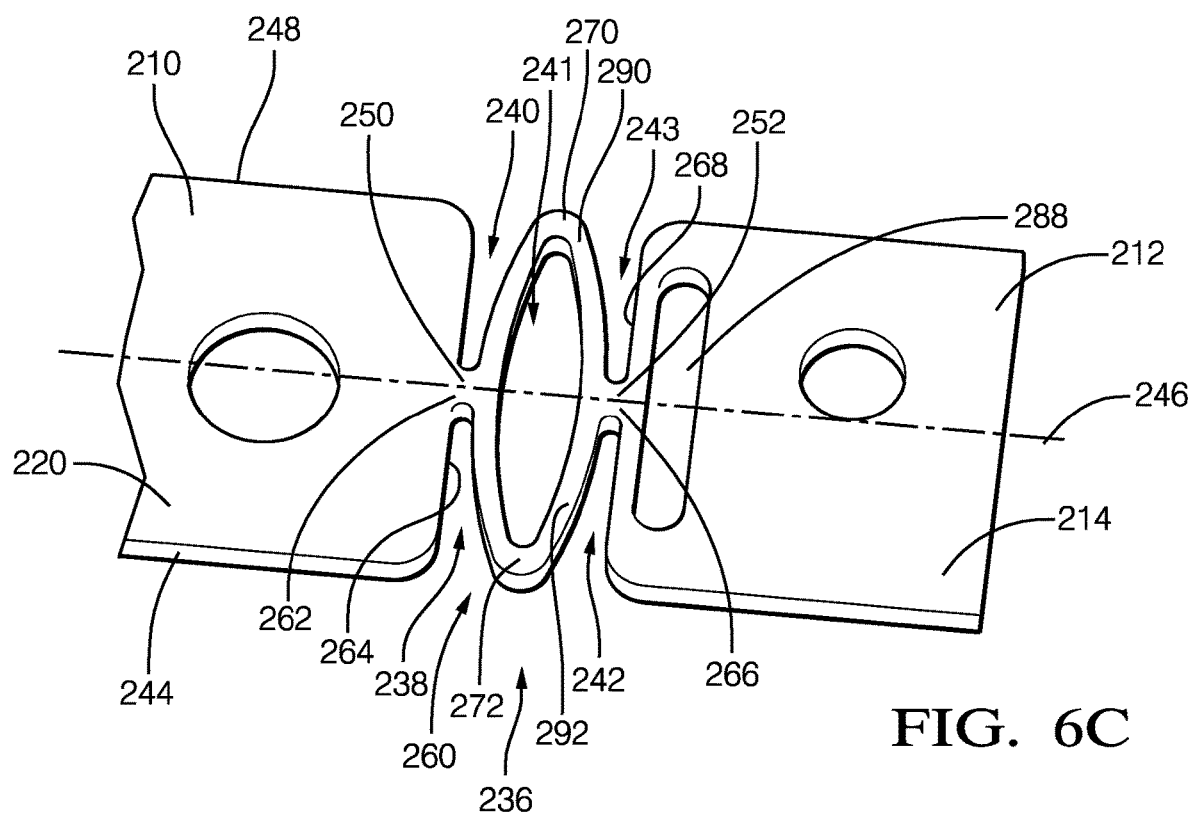
FIG. 6C shows a detail view of FIG. 6B.

FIG. 6A to 6C depict a third embodiment of a bus bar 210 according to the invention. The bus bar 210 has a rigid first portion 212 and a rigid second portion 220 which are connected to each other by a resilient compensation portion 236.

The resilient compensation portion 236 comprises four lateral recesses, a first lateral recess 238, a second lateral recess 240, a third lateral recess 242 and a fourth lateral recess 243. The first lateral recess 238 extends from a first side surface 244 into the bus bar 210 shorter than to a centerline 246. The second lateral recess 240 extends from a second side surface 248 in the direction of the first lateral recess 238 towards the first lateral recess 238 into the bus bar 210 shorter than to the centerline 246. The first lateral recess 238 and the second lateral recess 240 form a first web portion 250 that remains at the centerline 246 between the first lateral recess 238 and the second lateral recess 240 in a lateral direction. The first lateral recess 238 and the second lateral recess 240 taper towards the first web portion 250 at the centerline 146, i.e. the first and second lateral recess 238, 240 are wider at the first and second side surface 244, 248 and become narrower towards the centerline 246 of the bus bar 210.

The third lateral recess 242, same as the first lateral recess 238, extends from the first side surface 244 into the bus bar 210 shorter than to the centerline 246. The fourth lateral recess 243, same as the second lateral recess 240, extends from the second side surface 248 in the direction of the third lateral recess 242 towards the third lateral recess 242 into the bus bar 210 shorter than to the centerline 246. The third lateral recess 242 and the fourth lateral recess 243 form a second web portion 252 that remains at the centerline 246 between the third lateral recess 242 and the fourth lateral recess 243 in a lateral direction. The third lateral recess 242 and the fourth lateral recess 243 also taper towards the centerline 246, i.e. the third and fourth lateral recesses 242, 243 are wider at the first and second side surface 244, 248 and become narrower towards the centerline 246 of the bus bar 210.

Further, a hole-shaped recess 241 is formed in a center region of the resilient compensation portion 236. The hole-shaped recess 241 and the lateral recesses 238, 240, 242 and 243 form the web portions 250 and 252 as well as a first separate interconnecting part 290 and a second separate interconnecting part 292 which both connect the web portions 250 and 252. The interconnecting parts 290 and 292 are arch-shaped and together form an oval or O-shaped web 260. The web portions 250 and 52 as well as the interconnecting parts 290 and 292 together form the resilient compensation portion 236 extending from a centric part 262 of a face side 264 of the rigid second portion 220 to a centric part 266 of a face side 268 of the rigid first portion 212.

The O-shaped web 260 forms a first bendable zone 270 at an outer part of the first separate interconnecting part 290 and a second bendable zone 272 at an outer part of the second separate interconnecting part 292. Each bendable zone 270 and 272 is formed by a bend of the web 260 that is bent more than 90°.

Similarly as in embodiment 2, an oval hole 288 is formed in the rigid first portion 212 of the bus bar 210 to receive an elevation 278 (FIG. 6A) of a housing 234. The elevation's outer form is adapted to the hole's inner form so that the elevation's outer surface is contacting the hole's inner surface. The elevation 278 axially fixates the rigid first portion 212 so that no shear force is applied to a first fuse 218 connected to a first contact surface 214 of the rigid first portion 212.

Figure 7A:
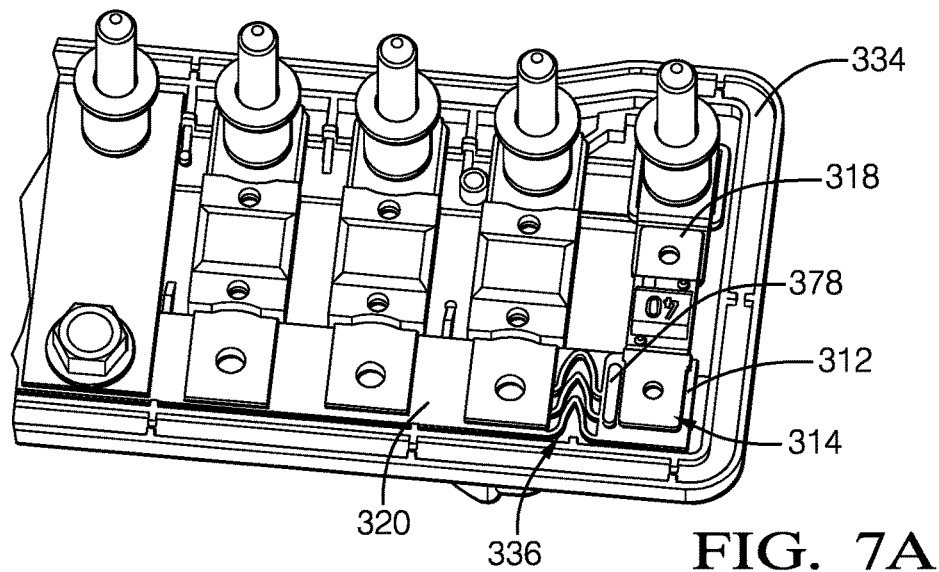
FIG. 7A shows a perspective view of an electric assembly with a bus bar according to a fourth embodiment of the present disclosure.
Figure 7B:
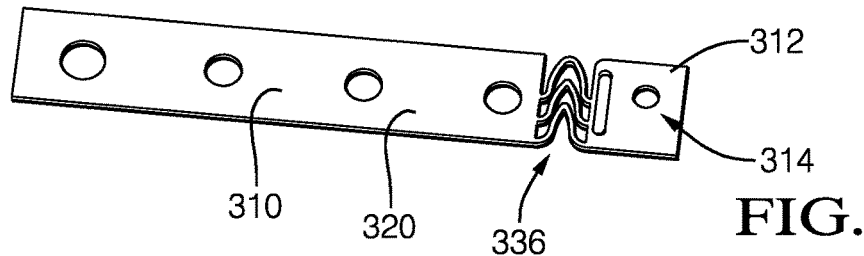
FIG. 7B shows a perspective view of the bus bar of FIG. 7A.
Figure 7C:
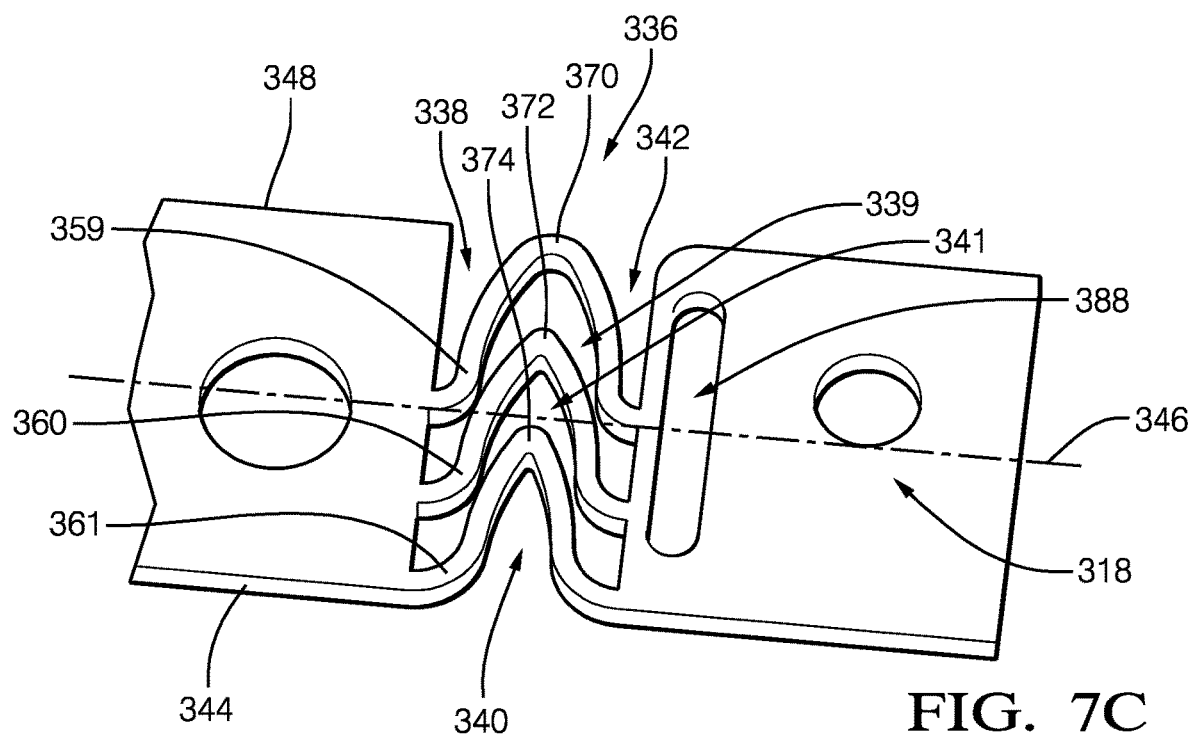
FIG. 7C shows a detail view of FIG. 7B.

FIG. 7A to 7C depict a fourth embodiment of a bus bar 310 according to the invention. The bus bar 310 has a rigid first portion 312 and a rigid second portion 320 which are connected to each other by a resilient compensation portion 336.

The resilient compensation portion 336 comprises three lateral recesses, a first lateral recess 338, a second lateral recess 340, and a third lateral recess 342. The first lateral recess 338 extends from a second side surface 348 into the bus bar 310 shorter than to a centerline 346. The second lateral recess 340 extends from a first side surface 344 shorter than to the centerline 346 into the bus bar 310. The third lateral recess 342, which is mirror-symmetrical to the first lateral recess 338, also extends from the second side surface 348 into the bus bar 10 shorter than to the centerline 346.

Two arch-shaped recesses 339, 341 are formed in a center region of the resilient compensation portion 236. Together the lateral recesses 338, 340 and 342 and the arch-shaped recesses 339 and 341 form three arch-shaped connector-webs 359, 360, 361 that extend from a face side 364 of the rigid second portion 320 to a face side 368 of the rigid first portion 312. Instead of three arch-shaped connector webs, one, two, four or more arch-shaped connector webs could be used.

The arch-shaped connector webs 359, 360, 361 each form a bendable zone 370, 372, 374. The bendable zones 370, 372 and 374 are all located on an axis extending in a lateral direction. Each bendable zone 370, 372, and 374 is formed by a bend of the respective web 359, 360, 361 of more than 90°.

Similarly as in embodiment 2 and 3, an oval hole 388 is formed in the rigid first portion 312 of the bus bar 310 to receive a laterally extending elevation 378 (FIG. 7A) of a housing 334. The elevation's outer form is adapted to the hole's inner form so that the elevation's outer surface is contacting the hole's inner surface in both axial directions. The elevation 378 axially fixates the rigid first portion 312 so that no shear force is applied to a first fuse 318 connected to a first contact surface 314 of the rigid first portion 312 due to a movement of the rigid first portion 312 relative to the housing 334.

Figure 8A:
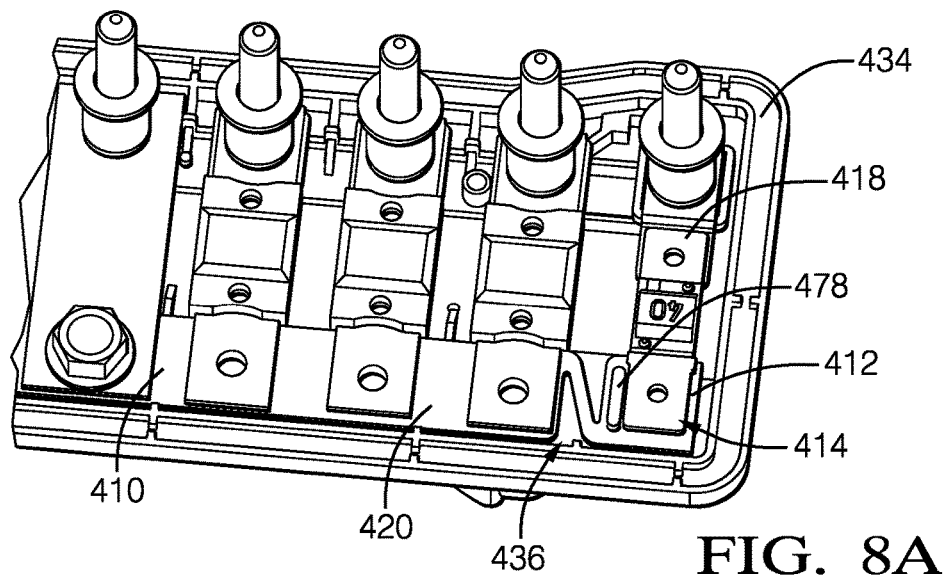
FIG. 8A shows a perspective view of an electric assembly with a bus bar according to a fifth embodiment of the present disclosure.
Figure 8B:
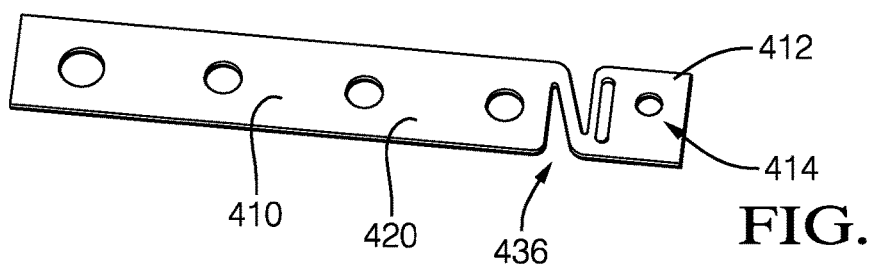
FIG. 8B shows a perspective view of the bus bar of FIG. 8A.
Figure 8C:
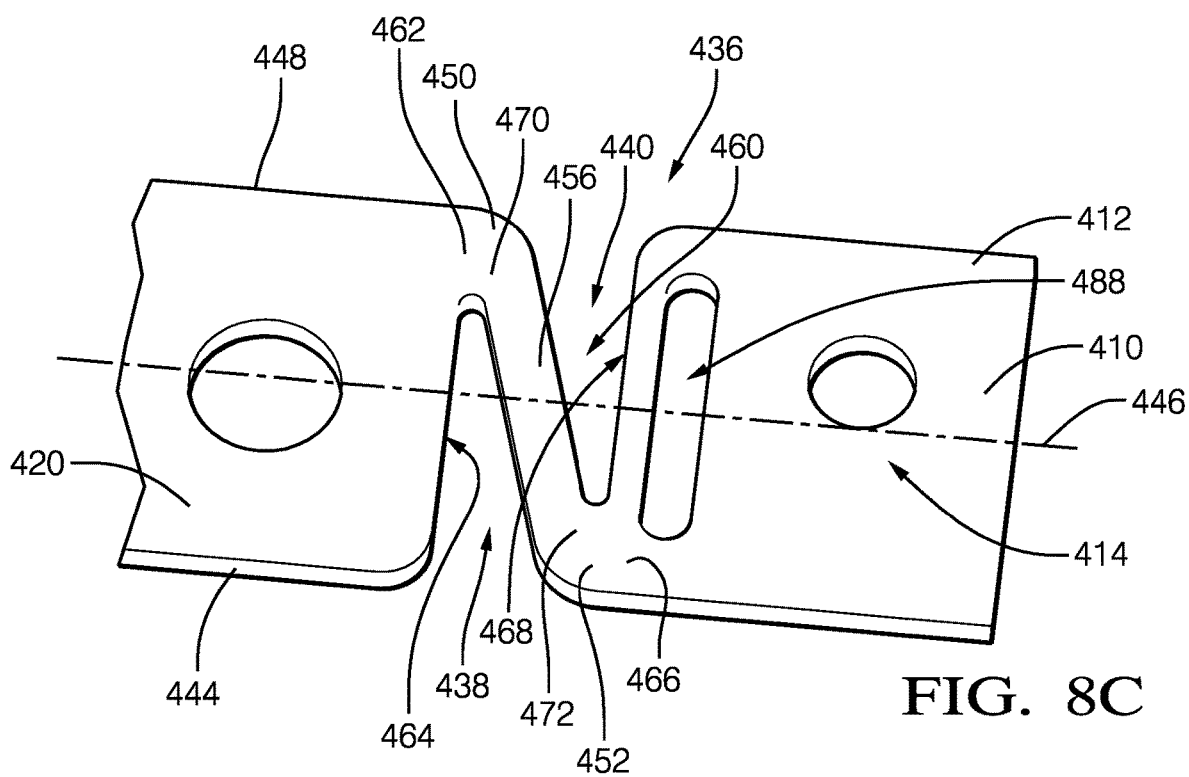
FIG. 8C shows a detail view of FIG. 8B.

FIG. 8A to 8C depict a fifth embodiment of a bus bar 410 according to the invention. The bus bar 410 has a rigid first portion 412 and a rigid second portion 420 which are connected to each other by a resilient compensation portion 436. The resilient compensation portion 436 comprises a first triangular lateral recess 438 extending from a first side surface 444 into the bus bar 410 further than a centerline 446 until only a first web portion 450 remains at an end of the lateral recess 438. The resilient compensation portion 436 also comprises a second triangular lateral recess 440 extending from a second side surface 448 further than the centerline 446 until only a second web portion 452 remains at the end of the lateral recess 440.

The lateral recesses 438 and 440 are spaced from each other in an axial direction so that a diagonal lateral web portion 456 is formed between the first lateral recess 438 and the second lateral recess 440. The diagonal lateral web portion 456 has a similar width than the web portions 450 and 452. The web portions 450, 456, and 452 together form a diagonal web 460 extending from an eccentric part 462 of a face side 464 of the rigid second portion 420 to an eccentric part 466 of a face side 468 of the rigid first portion 412.

The diagonal web 460 forms a first bendable zone 470 at a connection between the first web portion 450 and the lateral web portion 456 and a second bendable zone 472 between the lateral web portion 456 and the second web portion 452.

In this embodiment also, an oval hole 488 is formed in the rigid first portion 412 of the bus bar 410 to receive a laterally extending elevation 478 (FIG. 8A) of a housing 434. As explained before, the elevation's outer form is adapted to the hole's inner form so that the elevation's outer surface is contacting the hole's inner surface in both axial directions. The elevation 478 therefore axially fixates the rigid first portion 412 so that no shear force caused by thermal expansion of the bus bar 410 is applied to a first fuse 418 connected to a first contact surface 414 of the rigid first portion 412.

Figure 9A:
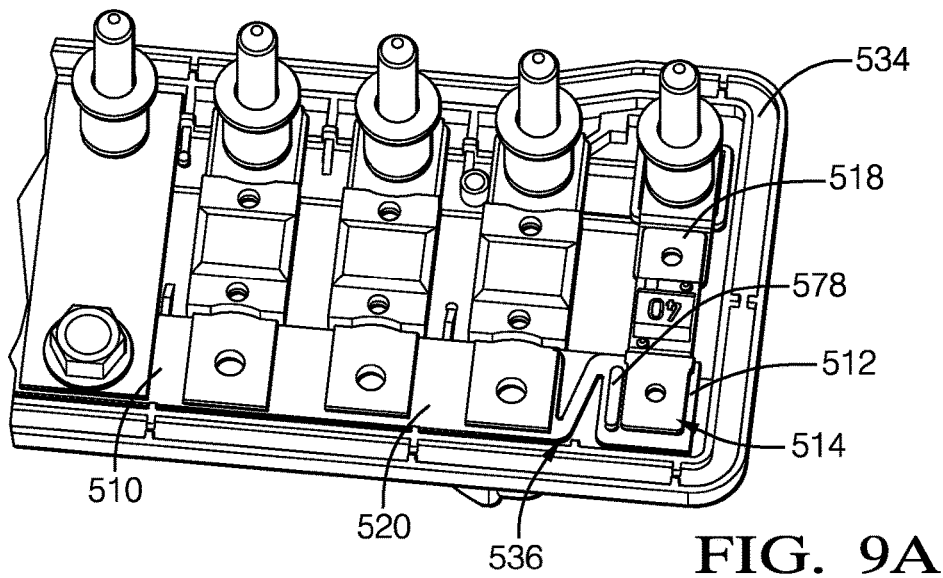
FIG. 9A shows a perspective view of an electric assembly with a bus bar according to a sixth embodiment of the present disclosure.
Figure 9B:
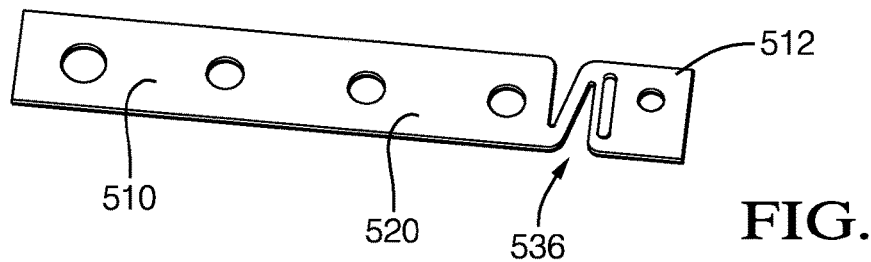
FIG. 9B shows a perspective view of the bus bar of FIG. 9A.
Figure 9C:
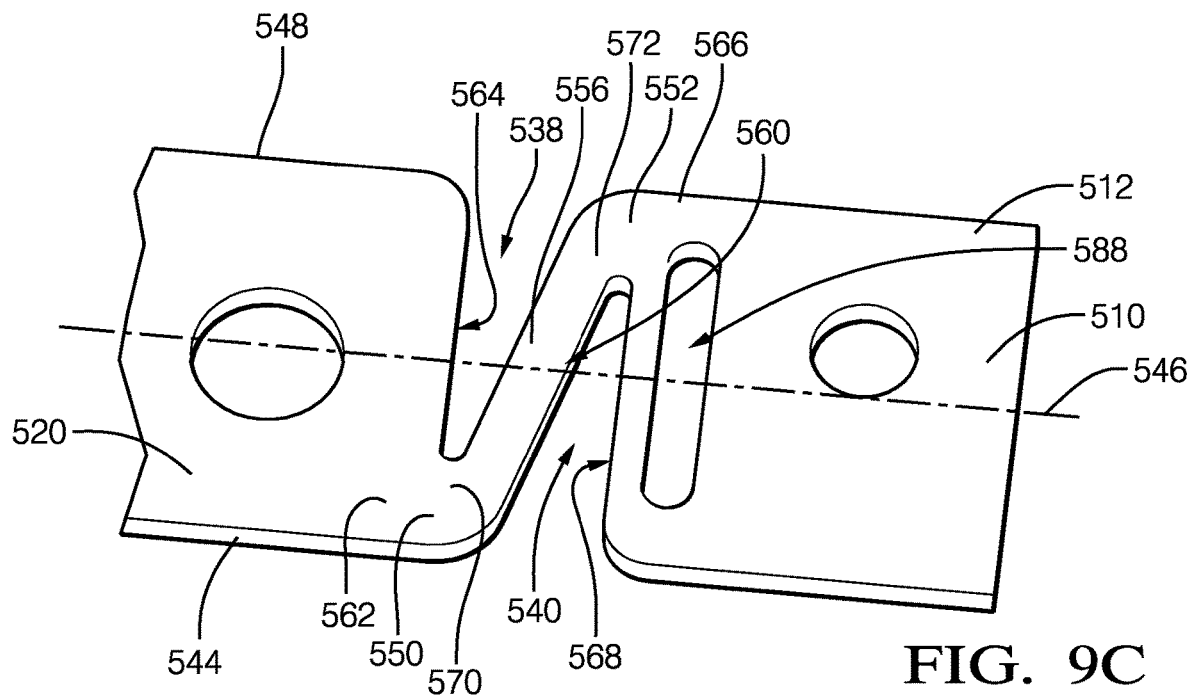
FIG. 9C shows a detail view of FIG. 9B.

FIG. 9A to 9C depict a sixth embodiment of a bus bar 510 according to the invention. The bus bar 510 also has a rigid first portion 512 and a rigid second portion 520 which are connected to each other by a resilient compensation portion 536. The resilient compensation portion 536 is mirrored in comparison to the resilient compensation portion 436 of the fifth embodiment and thus comprises a first triangular lateral recess 538 extending from a second side surface 548 into the bus bar 510 further than a centerline 546 until only a first web portion 550 remains at an end of the lateral recess 538. The resilient compensation portion 536 also comprises a second triangular lateral recess 540 extending from a first side surface 544 further than the centerline 546 until only a second web portion 552 remains at the end of the lateral recess 540.

As already described for the fifth embodiment, the lateral recesses 538 and 540 are spaced from each other in an axial direction so that a diagonal lateral web portion 556 is formed between the first lateral recess 538 and the second lateral recess 540. The diagonal lateral web portion 556 has a similar width than the web portions 550 and 552. The web portions 550, 556, and 552 together form a diagonal web 560 extending from an eccentric part 562 of a face side 564 of the rigid second portion 520 to an eccentric part 566 of a face side 568 of the rigid first portion 512. In particular, while the diagonal lateral web portion 456 of the fourth embodiment extends from the second side surface 448 of the rigid second portion 420 to the first side surface 444 of the rigid first portion 412, the diagonal lateral web portion 556 of the fifth embodiment extends from the first side surface 544 of the rigid second portion 520 to the second side surface 548 of the rigid first portion 512.

The diagonal web 560 forms a first bendable zone 570 at a connection between the first web portion 550 and the lateral web portion 556 and a second bendable zone 572 between the lateral web portion 556 and the second web portion 552.

In this embodiment also, an elongated hole 588 is formed in the rigid first portion 512 of the bus bar 510 to receive a laterally extending elevation 578 (FIG. 9A) of a housing 534. As explained before, the elevation's outer form is adapted to the hole's inner form so that the elevation 578 axially fixates the rigid first portion 512 in both directions.

Figure 10A:
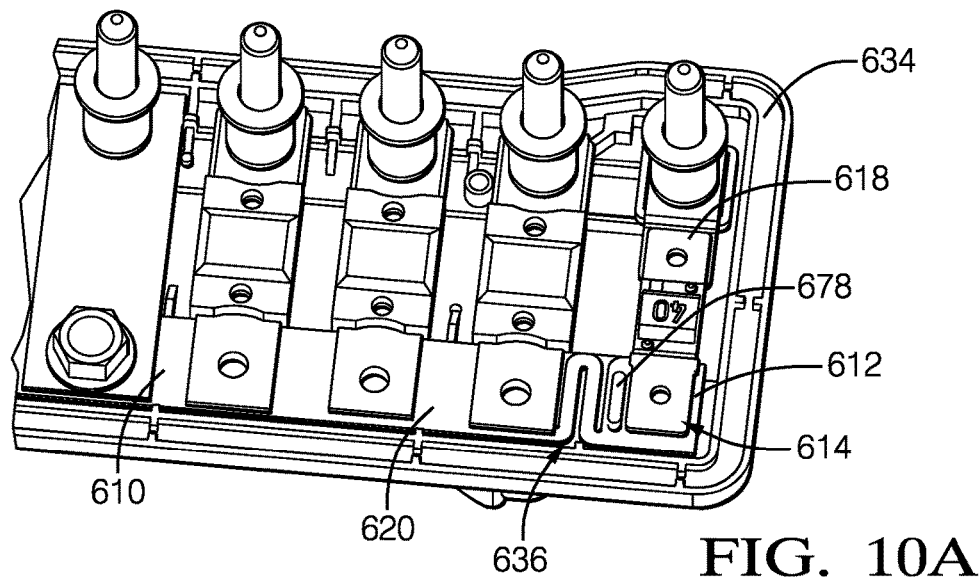
FIG. 10A shows a perspective view of an electric assembly with a bus bar according to a seventh embodiment of the present disclosure.
Figure 10B:
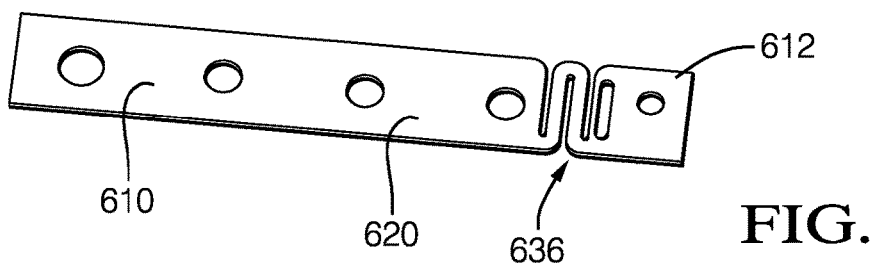
FIG. 10B shows a perspective view of the bus bar of FIG. 10A.
Figure 10C:
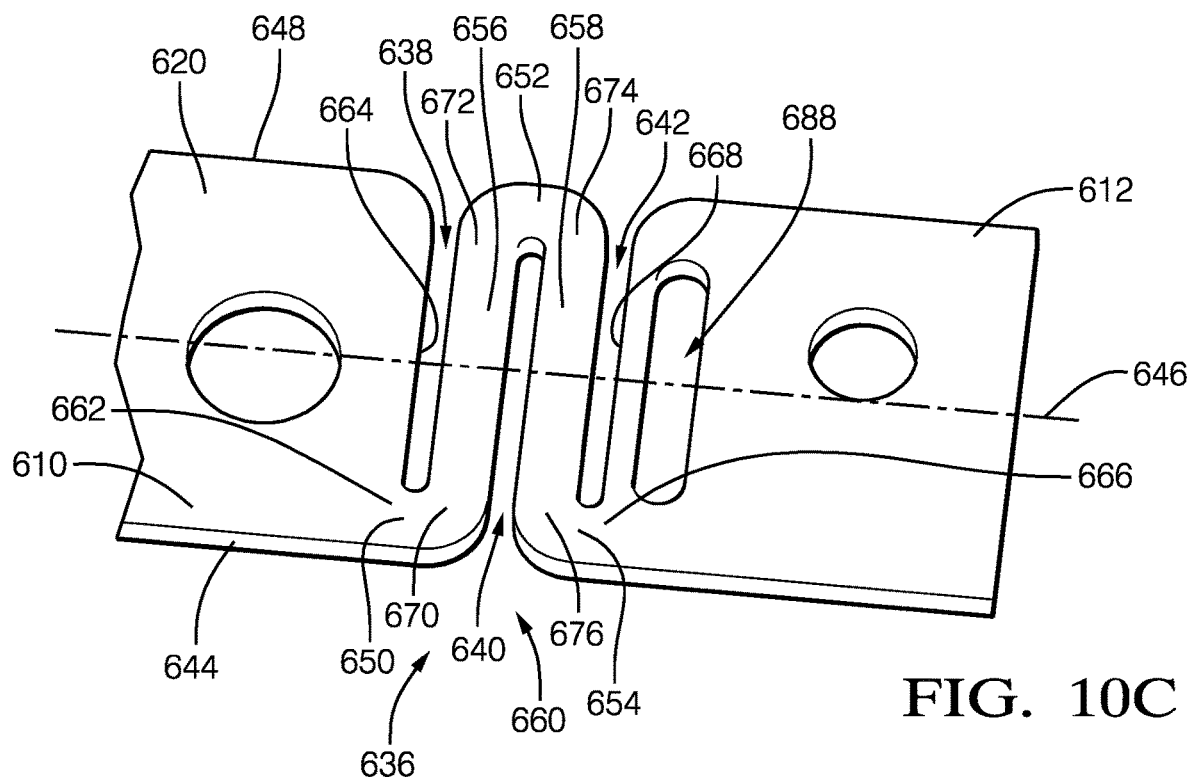
FIG. 10C shows a detail view of FIG. 10B.

FIGS. 10A to 10C depict a seventh embodiment of a bus bar 610 according to the invention. The bus bar 610 comprises a rigid first portion 612 and a rigid second portion 620 which are connected to each other by a resilient compensation portion 636.

The resilient compensation portion 636, similarly to the resilient compensation portion 36 of the bus bar 10 according to the first embodiment, comprises three lateral recesses, a first lateral recess 638, a second lateral recess 640, and a third lateral recess 642. The first lateral recess 638 extends from a second side surface 648 into the bus bar 610 further than a centerline 646 until only a first web portion 650 remains at an end of the first lateral recess 638. The second lateral recess 640 extends from a first side surface 644 parallel to the first lateral recess further than the centerline 646 until only a second web portion 652 remains at the end of the second lateral recess 640. The third lateral recess 642, same as the first lateral recess 638, extends from the second side surface 648 into the bus bar 610 further than the centerline 646 until only a third web portion 654 remains at an end of the third lateral recess 642. The lateral recesses 638, 640 and 642 are spaced from each other in an axial direction so that lateral web portions 656 and 658 are formed respectively between the first lateral recess 638 and the second lateral recess 640 and between the second lateral recess 640 and the third lateral recess 642. The lateral web portions 656 and 658 have a similar width than the web portions 650, 652 and 654. The web portions 650, 656, 652, 658 and 654 together form a U-shaped web 660 extending from an eccentric part 662 of a face side 664 of the rigid second portion 620 to an eccentric part 666 of a face side 668 of the rigid first portion 612. In comparison to the compensation portion 36 of FIGS. 3A to 4D, the compensation portion 636 has narrow lateral recesses 638, 640 and 642, i.e. a width of the lateral recesses 638, 640 and 642 is smaller than the width of the lateral web portions 656 and 658.

The U-shaped web 660 forms a first bendable zone 670 at a connection between the first web portion 650 and the lateral web portion 656, a second bendable zone 672 between the lateral web portion 656 and the second web portion 652, a third bendable zone 674 between the second web portion 652 and the lateral web portion 658, and a fourth bendable zone 676 between the lateral web portion 658 and the third web portion 654. Each bendable zone 670, 672, 674 and 676 is formed by a 90° bend of the web 660.

In comparison to the first embodiment of FIGS. 3A to 4D where no hole for the elevation 78 is needed, an oval hole 688 is formed in the rigid first portion 612 of the bus bar 610 to receive an elevation 678 (FIG. 10A) of a housing 634. The elevation's outer form is also adapted to the hole's inner form so that the elevation 678 axially fixates the rigid first portion 612 in both axial directions.

While this invention has been described in terms of the preferred embodiments thereof, it is not intended to be so limited, but rather only to the extent set forth in the claims that follow.

We claim:

1. An electric assembly, comprising:
    a bus bar having a rigid first portion with a first contact surface connectable to a first fuse, an axially spaced rigid second portion with a second contact surface connectable to a second fuse, and a connecting portion mechanically and electrically connecting the rigid first portion and a rigid second portion, wherein the connecting portion is a resilient compensation portion having at least two lateral recesses extending into the bus bar from opposite sides making the connecting portion elastically bendable to allow relative axial movement of the rigid first portion and the rigid second portion when an axial force is applied to the bus bar;
    a fuse; and
    a housing made of a material having a different coefficient of thermal expansion than the bus bar, wherein a first end of the fuse is mechanically and electrically connected to a first contact surface of the rigid first portion of the bus bar and a second end of the fuse is mechanically connected to the housing, wherein the housing comprises an elevated portion contacting a first face side of the rigid first portion to axially fixate the rigid first portion so that axial movement of the rigid first portion is restricted in a first axial direction relative to the housing by the elevated portion, wherein the elevated portion further contacts a second face side of the bus bar to axially fixate the rigid first portion so that axial movement of the rigid first portion is restricted in an second axial direction opposite the first axial direction relative to the housing by the elevated portion, wherein the rigid first portion defines a hole offset from one side of the connection portion which is configured to receive the elevated portion.

2. The electric assembly according to claim 1, wherein the connecting portion comprises three lateral recesses and wherein two recesses axially spaced from one another extend into the bus bar from the same side.

3. The electric assembly according to claim 1, wherein the connecting portion consists of a connector web.

4. The electric assembly according to claim 3, wherein the connector web extends from an eccentric part of a face side of the rigid first portion to an eccentric part of a face side of the rigid second portion.

5. The electric assembly according to claim 3, wherein the connector web is U-shaped.

6. The electric assembly according to claim 3, wherein the connector web extends from a centric part of a face side of a first portion to a centric part of a face side of the rigid second portion and comprises a bend and wherein the connector web comprises two separate interconnecting parts that are formed mirror-symmetrical to each other.

7. The electric assembly according to claim 3, wherein the connector web is V-shaped.

8. The electric assembly according to claim 7, wherein the connector web includes a plurality of V-shaped elements arranged in a chevron pattern.

9. The electric assembly according to claim 8, wherein the connector web is co-planar with the rigid first portion and the rigid second portion.

10. The electric assembly according to claim 3, wherein the connector web defines a oval shape perforated by an oval-shaped recess defined within.

11. The electric assembly according to claim 1, wherein the connecting portion comprises at least two connectors.

12. The electric assembly according to claim 1, wherein the compensation portion is elastically deformable to allow a relative axial movement of the rigid first portion and the rigid second portion when an axial force is applied to the bus bar to electrically and mechanically connect at least two separate fuses.

13. The electric assembly according to claim 1, wherein the fuse is a MIDI fuse having a first minimum cross-section and the connecting portion has a second combined minimum cross-section that is larger than the first minimum cross-section of the midi fuse.

14. The electric assembly according to claim 1, wherein multiple fuses are connected to the bus bar wherein the fuse with a smallest tripping current is connected to the first contact surface of the rigid first portion and wherein the first contact surface of the rigid first portion is placed at an end position of the bus bar.

15. The electric assembly according to claim 1, wherein the hole is characterized as having an oval shape.

* * * * *